United States Patent [19]
Fischer et al.

[11] Patent Number: 4,767,214
[45] Date of Patent: Aug. 30, 1988

[54] MIXER FOR BAKING DOUGHS AND THE LIKE

[75] Inventors: Harry A. Fischer, Ada; William G. Grutter, Grand Rapids, both of Mich.

[73] Assignee: Baker Perkins North America Inc., Saginaw, Mich.

[21] Appl. No.: 7,517

[22] Filed: Jan. 28, 1987

[51] Int. Cl.$^4$ .............................................. B29B 1/04
[52] U.S. Cl. ...................................... 366/99; 366/320; 366/297
[58] Field of Search ...................... 366/99, 98, 96, 69, 366/70, 320, 97, 297, 299, 300, 301, 318, 321, 97, 64, 66; 99/348

[56] References Cited

U.S. PATENT DOCUMENTS

| | | | |
|---|---|---|---|
| 886,899 | 5/1908 | Upright | 366/320 |
| 2,521,398 | 9/1950 | North | 366/320 |
| 2,836,401 | 5/1958 | Phelan | 366/320 |
| 3,946,997 | 3/1976 | Grenzebach | 366/320 |
| 4,241,590 | 12/1980 | Martineau | 366/320 |

*Primary Examiner*—Robert W. Jenkins
*Attorney, Agent, or Firm*—Price, Heneveld, Cooper, DeWitt & Litton

[57] ABSTRACT

An improved agitator structure for use in mixers for baking dough and other such food products and the like providing for improved mixing performance and speed, and useable in single-agitator or multiple-agitator embodiments, comprises an open, "shaftless" structure which incorporates straight and flat (i.e. planar) mixing blades as opposed to twisted or other complexly-curved blades, and incorporates a pair of mutually-spaced hubs aligned with one another along an axis of rotation, a pair of mutually-spaced mixer blades located generally on opposite sides of the rotational axis and extending generally longitudinally thereof along a different portion of such axis, with each such mixer blade disposed at a longitudinal angle with respect to such axis and each being connected to at least one of the hubs for rotation therewith about said axis. Each of the mixer blades comprises a generally planar member having a curved outer edge which lies substantially within the plane of its associated mixer blade, with the curved outer edge of the mixer blades defining a cylindrical service of revolution upon rotation of the blades about said axis.

36 Claims, 5 Drawing Sheets

MIXER FOR BAKING DOUGHS AND THE LIKE

FIELD OF THE INVENTION

This invention relates generally to the mixing of particulate and/or other forms of material, including the mixing of dry particles or granules with one another and with liquids and paste-like plastic masses. More particularly, the invention relates to apparatus for accomplishing such mixing, and in particular to new and novel agitator structures for use in such mixing apparatus, especially mixers such as those used in the baking arts. Notwithstanding this, it should be understood that the apparatus and technology provided in accordance herewith is not limited to the field of baking and on the contrary is useful and advantageous in many other specific applications where generally analogous mixing tasks are required.

BACKGROUND OF THE INVENTION

To a considerable extent, the various requirements which are involved in the mixing operations of commercial bakeries are also encountered in other food-processing and/or commercial and industrial activities, although the difficulties and obstacles present in the baking art often exceed those present in other fields.

For example, in the mixing of different baking doughs the requirement for achieving complete and substantially uniform dispersion of different materials, such as dry particulate matter, throughout the mix is more apt to be merely the beginning requirement rather than the ultimate one. For example, the recipes for different baked products often call for specific sequences of ingredient addition, with continuous mixing being carried out so that the addition of each different component technically produces a different mixture at a different point in time, and each such mixture is a prerequisite for the addition of the next ensuing ingredient. At the same time, baking doughs involve the physical chemistry of hydration, since they typically combine dry ingredients with various different liquid ingredients of widely-varying viscosities (e.g. from water to various oils, etc.), as well as utilizing various pastelike materials such as solid shortenings and the like, all of whose mixing characteristics differ very substantially from one another. Furthermore, baking often involves other requirements such as the need to "cream" ingredient mixtures by uniformly dispersing wet and dry ingredients and then working the resulting mix so as to incorporate air into it, as well as the requirement for "developing" dough, which involves plastic deformation of a hydrated dough mass, frequently including the need for substantial amounts of shearing or kneading of the dough mass by the mixer blades.

Generally speaking, food mixers are predominantly of the "horizontal" type, i.e., having agitators which rotate about a horizontally-disposed axis, although there are also various vertical mixers and special purpose devices. As will be understood, commercial food and/or bakery-product mixers operate on dough masses of the same general type as those encountered in home baking where mixers are usually of the vertical type, but the need for quantity and speed are substantially different in commercial operations, and this substantially exacerbates the degree of difficulty in meeting functional requirements as well as the significance of power consumption and the importance of speed. Thus, a mixer which performs well in the home environment may very well not do so in the commercial environment, but a mixer which performs well in the commercial environment is practically assured of functional acceptability, and probably of functional superiority, in other environments.

In the past, the predominating type of horizontal commercial mixer utilized one or more agitator elements having long, thin mixer blades which were bent into a helically-curving, longitudinally twisted shape. Typically, such prior agitator structures had a pair of such helical blades, each extending longitudinally along approximately half the length of the agitator but disposed on opposite sides thereof and located along different axial portions, i.e., each blade extending generally from an opposite end of the agitator and toward its midsection. In such agitators, a radially-extending cross arm located generally centrally of the structure is used to interconnect and reinforce the two opposite helically-curved mixing blades because the latter must of necessity have thin cross sections and are comparatively weak. Because of this structural weakness, such agitators had to have a rigid center drive shaft disposed along the axis of rotation, which supported and rotatably drove the twisted, helical mixer blade sections during mixing activity.

Agitators of the type just described have become an industry standard over the many, many years in which they have been used, even to the extent of being taken for granted and thus foreclosing objective evaluation of their performance. In fact, while it has to a large extent been presumed that mixers utilizing such agitators provided desirable or even optimum results, the present inventors have determined that such is not always, or even usually, the actual result, and that on the contrary such agitators provide a great many areas of defective performance, depending upon the specifics of the mixing task involved, such as the type of media to be mixed, amount of development required, desired speed of performance, etc. In addition, it is not unusual to experience torsional failure in such agitators, due to the inherent structural weakness noted above, at which time the helical blades become twisted and bent, in effect destroying the agitator.

In addition, the previously predominating type of agitator structure, as described above, also inevitably involves the very serious disadvantage of having a high degree of manufacturing difficulty, resulting in the near impossibility of precise duplication. That is, in order to obtain the helically-curving shape, the mixing blades of such agitators had to be formed from comparatively thin elongated sections of metallic plate stock, which could be bent into generally helical configuration by complex processes, usually involving hammering and forging, etc. In fact, this type of blade actually involved a double curvature, which incorporates a twisting moment. Such a structure inevitably requires substantial individual shaping steps and considerable custom work, machining, etc. Furthermore, while such a complex shape is producible by casting processes, this involves very substantial expense and, furthermore, also requires considerable finishing machining, in order to obtain the required final dimensions and shaping. Of course, manufacturing of such agitators also involve the requirement for mounting the curving, twisting, helical mixing blades upon the center support shaft, and rigidly securing the same thereto so that they may withstand the demanding structural requirements encountered in actual use.

Due to these extensive fabrication difficulties, agitators of the type described above could never be produced as efficiently and economically as desired, and each such twisted helical blade is not likely to be identical to the next, resulting in substantial difficulty in producing operationally-satisfactory mixers having multiple agitators. Additionally, these fabrication and design problems kept the manufacturers involved from developing an agitator structure which was sufficiently strong to eliminate the center support shaft, even though such shafts present substantial operational disadvantage because they inherently interfere with desirable mixing flow patterns and introduce "dead zones" in the mixer interior. Also, such center shafts tend to promote build-up of the mix media along them, and thus introduce cleaning problems.

THE PRESENT INVENTION

The present invention provides significant and extensive improvements for mixers of the general type described above, by way of a new concept in agitator structures for use in such mixers. In so doing, the invention provides for substantially improved results in mixing performance, as well as providing substantial improvements in manufacturability, thereby yielding commensurate advantages in both such areas. From the standpoint of mixing performance, improvements are provided in mixing speed as well as in the completeness and efficiency of achieving uniform component dispersion within the mix, including the substantial elimination of "dead zones," such as have virtually always been present in prior mixers, where little or no true mixing occurs and lack of homogeneity and uniformity in the resulting mix is therefore characteristically an inseparable adjunct of mixer performance.

From the standpoint of structural design and manufacturability, the novel agitator structure of the present invention may, and preferably does, comprise an assemblage of component parts which are individually manufactured by much more standardized processes from much more standardized stock than has been true heretofore, thereby eliminating both the attendant structural weakness and manufacturing expense which characterized prior agitators of the twisted helix type. At the same time, the novel agitator structure in accordance herewith provides the very desirable attribute of enhanced applications flexibility; i.e., agitators in accordance with the present invention have a high degree of scaleability and may readily be manufactured with various differing dimensions to satisfy particular applications and requirements. This desirable result may be achieved, in essence, simply by changing the dimensions of selected component parts without necessarily changing others, manufacture (assembly) of components into the operative agitator structure proceeding in substantially the same way and by the same procedure in each such instance, without extensive and costly special machining or assembly processes.

The foregoing objectives and advantages of the invention are provided by an agitator structure which is open and "shaftless" along its axis of rotation, and which incorporates straight and flat (i.e., planar) mixing blades rather than twisted or otherwise complexly-curved blades. This structure improves strength and performance as well as enhancing manufacture, since it may be accomplished by use of flat stock (e.g., metal plate) and does not require forging or hammering operations, or any need for complex castings. Furthermore, preferred embodiments of the new and novel agitator structure eliminate and/or change the basic componentry of known agitators, incorporating (for example) elements whose shape and location are different than those which have become the norm in the past. Such new and different structures not only improve mixing performance, as noted above, but also provide the manufacturing and applications advantages and economies which have also been noted.

The foregoing attributes and characteristics of the invention will become more apparent and better understood by reference to the ensuing description of certain preferred embodiments of the underlying concepts, particularly in contemplation of the appended drawings depicting such embodiments.

DESCRIPTION OF PREFERRED EMBODIMENTS

Figure 1:
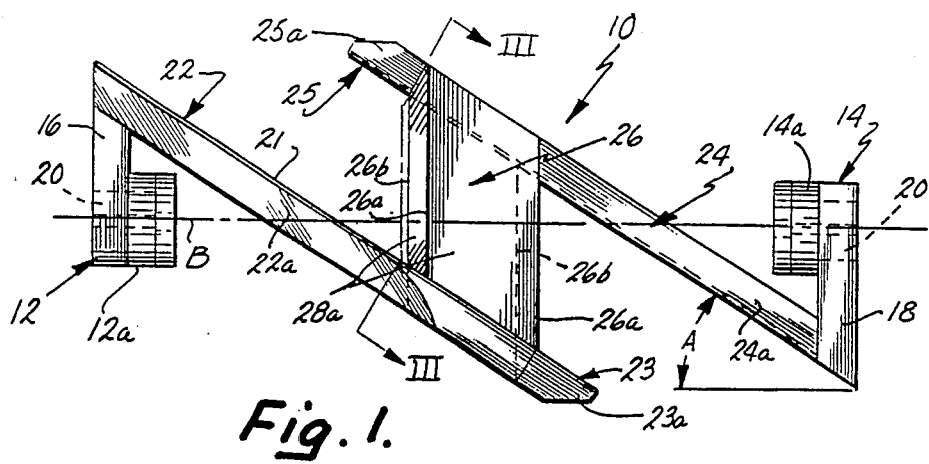
FIG. 1 is an overhead plan view of a first preferred agitator structure embodiment.
Figure 2:
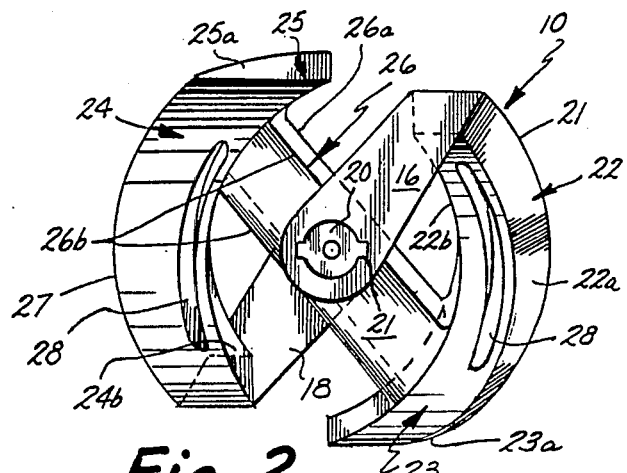
FIG. 2 is an end elevational view of the apparatus illustrated in FIG. 1.
Figure 3:
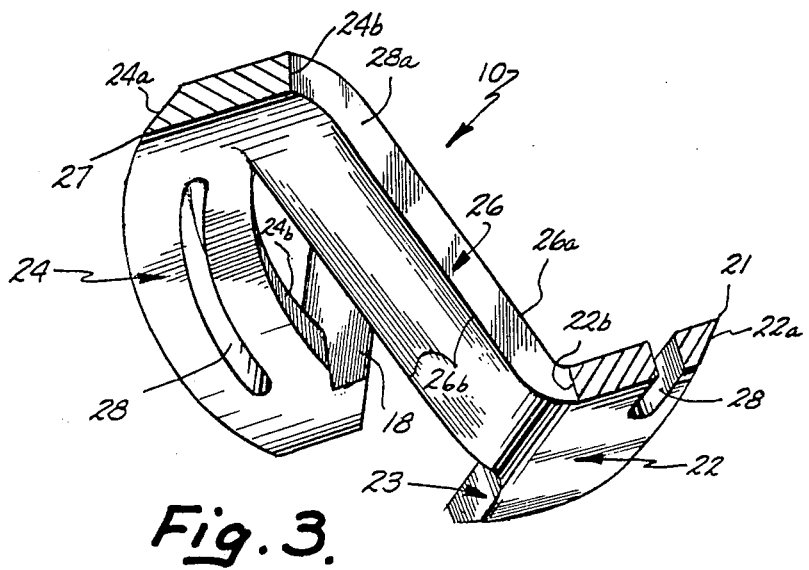
FIG. 3 is a cross-sectional elevational view taken along the compound plane III—III of FIG. 1.

Referring now in more detail to the drawings, FIGS. 1-3 inclusive illustrate a first embodiment of an agitator structure 10 in accordance with the invention. As there illustrated, it will be seen that the agitator structure 10 embodies an open, shaftless design, having axially-aligned hub portions 12 and 14 at each opposite end, by which the agitator may be rotatively mounted upon appropriate trunnion shafts within a mixer housing. More particularly, each of the hubs 12 and 14 comprises a generally circular support boss 12a which is welded or otherwise secured to the inside face of a crank arm 16, 18, respectively, the resulting assembly being bored, and machined and assembled, to produce a pair of aligned mounting and driving apertures 20 having keyways 21, as illustrated (FIG. 2).

The crank arms, or drive arms, 16 and 18 extend in generally opposite radial directions from the axis of rotation, and each is secured to, and supports, one or the other of a pair of mixing blades 22, 24 respectively, which are preferably disposed generally parallel to one another and oriented at an acute angle "A" (FIG. 1) with respect to the drive axis (which is labeled "B" in FIG. 1). As further illustrated in FIGS. 1 and 2, the inboard portions of mixing blades 22 and 24 located centrally of the agitator 10 are interconnected by a center blade, or connector blade, 26, which extends generally transversely across the rotational axis B and is rigidly secured to each of the two respective mixing blades 22 and 24 to reinforce and support them.

Accordingly, it will be seen that the customary axial support shaft which has for so long been considered an inseparable part of conventional mixer agitators has been entirely eliminated, and a much different structural arrangement provided. Furthermore, it will be noted that the geometry of each of the mixing blades 22 and 24 is not of twisted-helix configuration, or even of helical configuration, but is instead generally planar. Thus, the mixing blades may advantageously be made from flat-sided plate-like stock which is cut into an arcuate overall shape and chamferred, or angled, along the top and bottom sides 22a, 22b and 24a, 24b, respectively. As may be seen in FIG. 3, these chamferred sides are disposed such that they converge toward one another (preferably, with a sharper angle on the top, or outer sides 22a, 24a), thereby giving the mixing blades a polygonal cross section, in particular, a trapezoidal cross section. As illustrated, arcuate or other slots 28 may be cut through the mixing blades to provide additional shearing effects where this is desired, although in many instances such slots will not be necessary.

Those who are skilled in the art and familiar with horizontal-axis mixers as have come to be known heretofore will immediately recognize the structural unconventionality of the mixing blades 22 and 24, both with respect to shape and size. That is, the thickness and massiveness of such mixing blades are striking in comparison to the typical twisted-helix type of mixer blade, as is the use of the flat blade configuration employed in accordance herewith, by which the relative high strength and rigidity are obtained. A further feature of this configuration should also be noted, however; i.e., the sweep angle, or mixing angle, "A" is continuous and uniform along the entire length of each mixing blade 22 and 24, and this feature provides substantially different and more desirable mixing action than that obtainable from known prior agitator structures. That is, the mixing action afforded by agitators in accordance herewith (whether employed in single or double-agitator mixers) is much more uniform and consistent, and may be optimized for a particular type of operation by selection of a particular desired mixing angle (different operations such as dispersion and development optimally requiring different mixing angles); moreover, the selected optimal mixing angle is maintained consistently and continuously along the entire length of each mixing blade. The continuous and consistent mixing action so produced is dramatically different, and superior, to that obtained from prior types of agitator structures, especially those of the twisted helix type, which provide differing mixing angles all along the length of their mixing blades.

It will further be noted that mixing blades 22 and 24 are positioned such that their respective leading edges move in the same rotational direction, but the angularity of the mixing blades is such that the mixing operation which they provide is, in effect, to continuously move a swept stream of the mix from opposite ends (actually, from opposite corners) of the mixer (viewed as an envelope which approximates the surface of revolution defined by agitator rotation) toward the center portion thereof, thus continuously combining and intermixing the particles or other media within the mixing chamber. In this respect, the silhouette presented by the outer periphery of each of the mixing blades 22 and 24 defines a circle, viewed from the end of the agitator Thus, upon rotation, the mixing blades define a uniform, right-circular cylinder of revolution, such that the edges of the blades continuously sweep along and closely adjacent to the inside periphery of the mixer housing over the length of the mixer blades The outer surfaces or faces 22a and 24a taper back somewhat more angularly than the corresponding inner surfaces 22b and 24b (note FIG. 3), to minimize cohesive build-up of the mix media along the outer such surfaces, where the maximum relative movement of the mix media occurs, thus keeping the agitator blades clear and clean, and enhancing thorough and complete mixing of the media.

Further with respect to the mixing pattern and mix media movement provided by the novel agitator structure in accordance herewith, it should be noted that the inboard end extremity of each of the mixing blades 22 and 24 preferably has an extension portion 23, 25, respectively (FIGS. 1 and 2), which protrudes beyond the intersection of the corresponding mixing blade with the center blade, or connector, 26. These extension portions, which as illustrated extend substantially beyond the midpoint of the agitator, provide very desirable additional mixing action in the center area of the agitator. Although not well appreciated heretofore, this center area has in fact long been the site of very imperfect, and incomplete, mixing performance, as is amply demonstrated by the development of observable lines of striation in the mix media (where multi-colored mix components are utilized) extending generally orthogonally to, and around the center area of, the agitator. Of course, such lines show that the media is simply being inadequately mixed in this area, leading to lack of homogeneity and, in many instances, incomplete development of baking dough. The presence of the extension portions 23 and 25, and the substantially enhanced mixing effects provided thereby, together with the results achieved by the center blade 26 (as described hereinafter), substantially eliminate this problem by achieving much more extensive and complete mixing throughout the central area of the agitator.

Due to the relative geometry of the agitators and the mixer housing, which is typically a uniform and continuous right circular cylinder, it is desirable that the outermost faces 23a and 25a (FIG. 1) of the corresponding mixing blade extension portions 23 and 25 be machined to have a cylindrical surface configuration which closely complements that of the inside of the mixer housing. This establishes and maintains the desired clearance between the mixer blade and the inside surface of the mixer housing (which is preferably on the order of about one-eighth inch). This, in turn, establishes and maintains an important parameter of the desired mixing operation, since if this clearance is too wide it will substantially diminish proper mixing action, whereas if it is too narrow it will damage and degrade the mixture in the affected area, even to the extent of causing localized burning of the mix due to friction. Thus, this clearance should be accurately established, and it should also be consistently maintained throughout the length of the blade. This has been a significant failure of prior agitators, but is a significant achievement obtained by the present invention.

In addition to the mixing blade extension portions 23 and 25, discussed above, mixing operation at the center area of the agitator 10 is also affected by the shape and position of the center blade, or connector, 26. That is, the shape and orientation of connector blade 26 (FIGS. 2 and 3) are preferably selected to enhance mixing operation, as well as to structurally support the mixing blades 22 and 24. Thus, while the connector blade 26 may advantageously be comprised simply of a section of bar or plate stock, having a rectangular cross section which is disposed with its longitudinal axis lying generally orthogonally across the axis of agitator rotation, the connector blade 26 is preferably canted laterally somewhat with respect to the longitudinal axis "B" (FIGS. 2 and 3), and also is preferably positioned to intersect the plane of each mixing blade 22 and 24 at an acute angle. Thus, connector blade 26 preferably rotates through the center area of the mixer in an angular disposition, having leading and trailing edges 26a and 26b, respectively, as well as leading and trailing surfaces 28a and 28b, respectively, which shear and impel the mix media as the agitator rotates, helping to move the media outwardly from the center area of the mixer in cooperation with the mixing blades themselves and, in particular, in cooperation with the extension portions 23 and 25 of the mixing blades. At the same time, cohesive build-up of the mix media upon the connector blade 26 is substantially reduced by the angulated structure just described.

Figure 4:
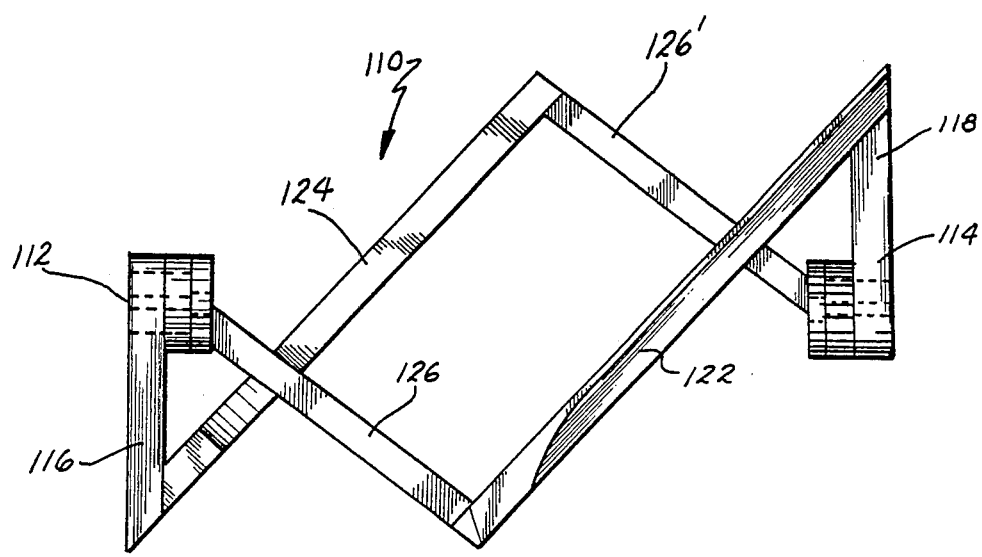
FIG. 4 is an overhead plan view of a second preferred embodiment for an agitator structure in accordance herewith.
Figure 5:
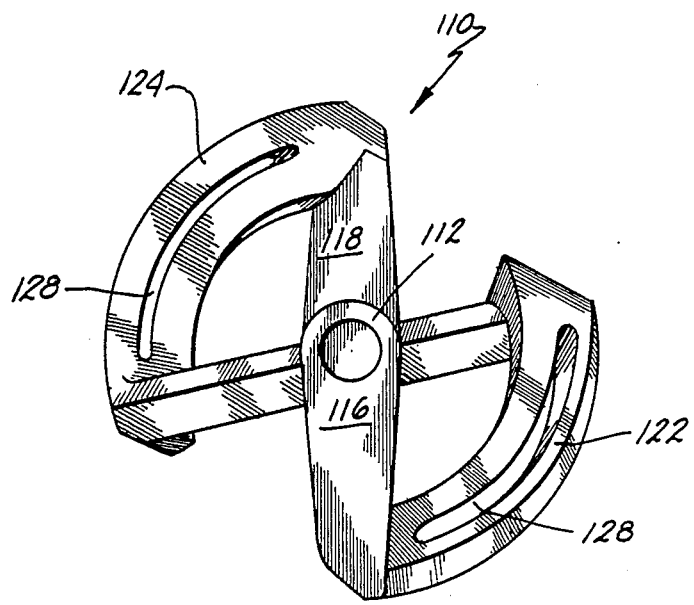
FIG. 5 is an end elevational view of the agitator structure shown in FIG. 4.
Figure 6:
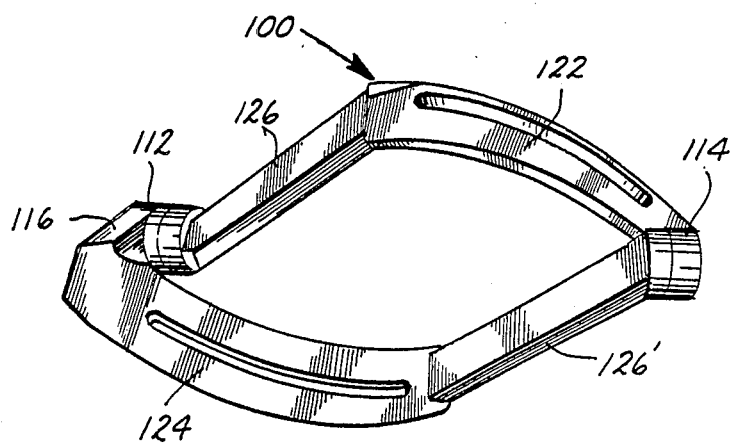
FIG. 6 is a front perspective view of the agitator structure shown in FIGS. 4 and 5.

As previously indicated, FIGS. 4, 5 and 6 illustrate an alternative preferred embodiment 110 of agitators in accordance with the invention, which also have highly advantageous attributes while at the same time embodying structural variations which further illustrate certain of the underlying concepts of the invention.

With further reference to FIGS. 4, 5 and 6, it will be noted that the agitator 110 shown there includes a pair of spaced end hubs 112 and 114, which are essentially like the hubs 12 and 14 described above in conjunction with the embodiment of FIGS. 1-3, and in the same analogous manner the agitator 110 includes a pair of mutually-spaced mixing blades 122, 124 which are connected by respective crank arms 116 and 118 to the aforementioned end hubs. While these components of the agitator 110 are quite similar to the corresponding structures of agitator 10, it will be noted that the agitator 110 does not have a center or connector blade such as the blade 26 of the first embodiment and, on the contrary, the mixing blades 122, 124 are 20 connected to strut-like support bars 126, 126', respectively, which extend from each respective mixing blade to the opposite end hub. This arrangement, of course, also provides a "shaftless" agitator structure which, as a result of the structural features just noted, is entirely open throughout its middle area. Nonetheless, the mixing action provided by the agitator 110 throughout the center area (as well as other areas) is vigorous and active, with little or no of the "dead zone" effect exhibited by most prior art horizontal agitators.

One reason underlying the highly effective iixing performance of the agitator 110 just noted is the structure embodied in the mixing blades 122, 124 (which are, as already indicated, essentially like blades 22 and 24 of agitator 10); however, the other structural attributes of agitator 110 are also significantly involved in the highly effective mixing performance of this embodiment. For example, the angular disposition of the struts, or connector bars 126, 126', together with the cross-sectional shape and the basic orientation of these bars with respect to the sweep motion of the associated mixer blades, also contributes substantially to the desirable mixing performance of this agitator. Thus, the angular position of rectangular cross section bars 126, 126' with respect to their associated mixing blades 122 and 124 provides a strong stirring, or mixing, action which is of a different nature than that provided by the mixing blades themselves, as well as being different from that provided by the center blade 26 which is present in the agitator 10 of FIGS. 1, 2 and 3. Furthermore, the relative angulation between the connecting bars 126, 126' and their associated mixing blades 122 and 124 provides, in effect, a plow-shaped structure on each opposite side of the agitator 110 which strongly moves the mix material away from the center area. In this regard, it should be noted that the two angularly-shaped such "plows" are preferably not directly aligned with one another across the axis of rotation, i.e., the mixing blades 122 and 124 are preferably longer than the struts or bars 126, 126'.

The novel type of agitator structures in accordance with the concepts of the present invention, as discussed above, are not only advantageous when used singly in an appropriate mixer housing but, in addition, may readily be used conjointly in pairs; in particular, both embodiments of such agitators may be used in pairs, to provide coordinated, interleaved, operation in which the outer surface of revolution defined by each mixing blade element enters into and passes through that of the corresponding mixing blade in the adjacent agitator. Such a combined, paired-agitator mixer is illustrated in FIGS. 7-11 inclusive, in which the two separate agitators of the type shown in FIGS. 1-3 inclusive (designated 10 and 10', respectively) are shown cooperatively mounted within a mixer housing 30.

As illustrated in FIGS. 7-11, the mixer housing 30 basically comprises an open-topped, laterally-enclosed vessel (often called a "bowl" even though not generally spherical, or semi-spherical in shape), defined by oppositely-spaced sidewalls 32 and 34 and end walls 38 and 40. The lower extremities of sidewalls 32 and 34 curve under and partially around the agitators 10, 10' and extend toward one another to form a ridge or peak 36 inside the mixer housing; i.e., the lower extremities of the sidewalls 32 and 34 comprise complementary longitudinal segments of a cylinder whose inner periphery approximates the lower part of the surface of revolution defined by the two agitators. These cylindrically-configured sidewalls are closed at each opposite end by flat end walls 38 and 40, to form an enclosing vessel around the sides and bottom of the agitators.

Within the mixer housing 30, the two agitators 10, 10' are disposed in side-by-side relation, with their corresponding hubs 12 and 14 mounted upon drive shafts or pivot axles extending through the end walls 38 and 40. As will be understood, the two such agitators may be rotatably driven by such axle members, either from one or both ends as the occasion may demand. Agitator structures in accordance with the present invention will typically have ample structural strength and rigidity to permit application of drive force from only one end, and a typical form of drive may utilize a drive gear (not specifically shown) which is secured to a drive shaft (not specifically shown) that extends from the hub portion of each of the two agitators outward through the adjacent end wall 38, either or both such drive gears being suitably engaged with another such gear (not specifically shown) for transmittal of the required drive forces. As will be appreciated, mutual engagement of such drive gears will establish and maintain the desired coordinated positioning of the two agitators relative one another as they are rotatably driven, although of course other types of engagement or drive structure may also be utilized to the same effect.

Figure 7:
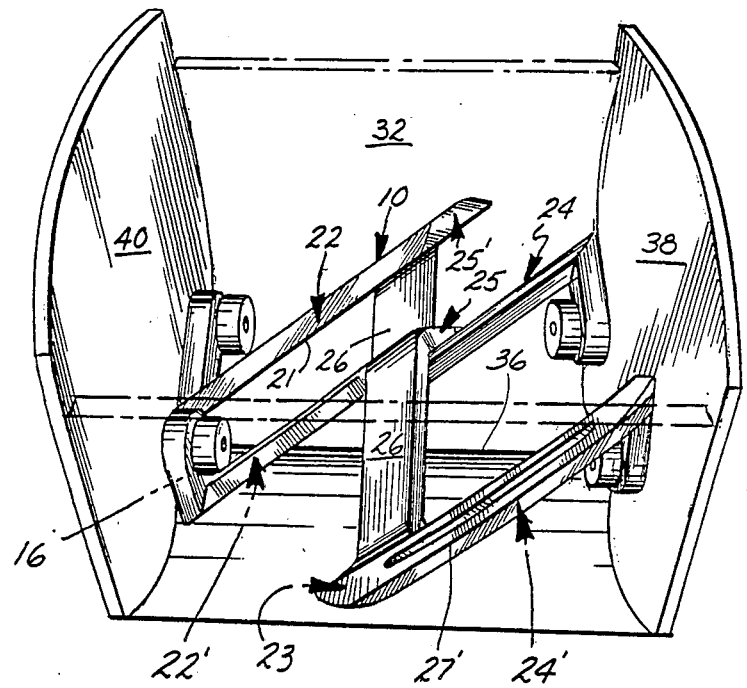
FIGS. 7-11 inclusive are a series of overhead perspective views showing a pair of the agitator structures in accordance with FIGS. 1-3 operatively mounted in double-agitator configuration within a mixer body, i.e. "bowl," showing various relative positions of rotation for the two such agitators which occur during normal operation of such a mixer.

The various positions of coordinated rotation of the two agitators 10, 10' may be understood by considering FIG. 7 to represent the end of one complete revolution, and by considering FIGS. 8-11 as representing the sequential positions leading to that of FIG. 7. More particularly, in FIG. 8 it will be noted that the agitators 10, 10' are in essence reversed from the relative positions shown in FIG. 7; that is, in FIG. 8 mixing blades 24, 24', located at the right-hand side of the mixer, are disposed closely adjacent and generally parallel to one another, whereas the other two such mixing blades 24, 24' are spaced widely apart. In this relative position of the two agitator structures, the center blades 26, 26' thereof are disposed generally crosswise of one another, in a somewhat T-shaped arrangement.

Figure 8:
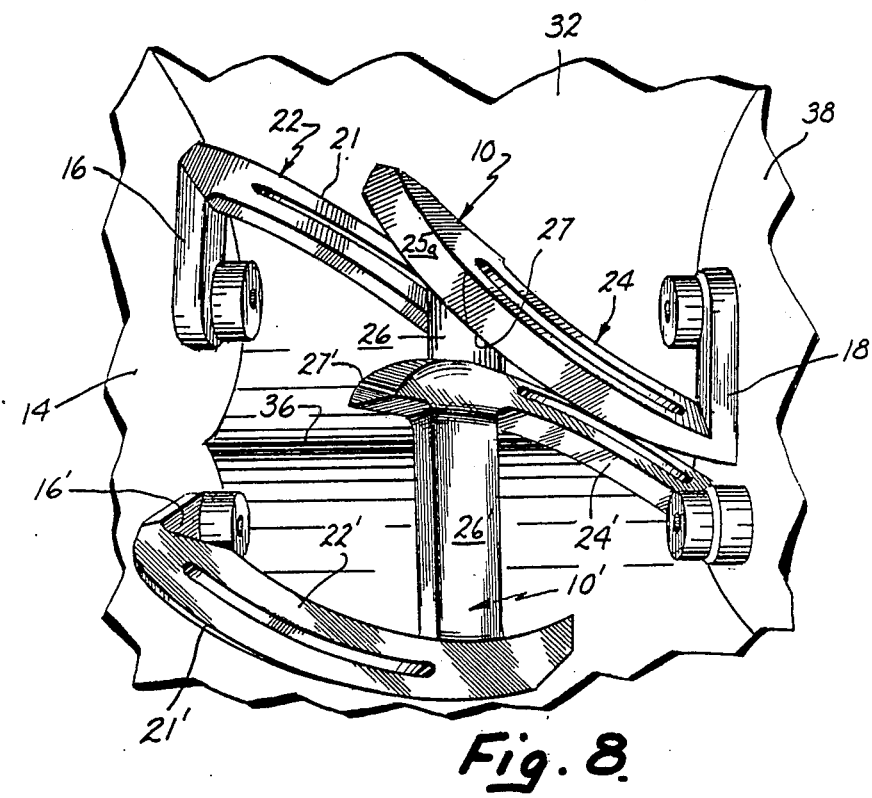
Figure 11:
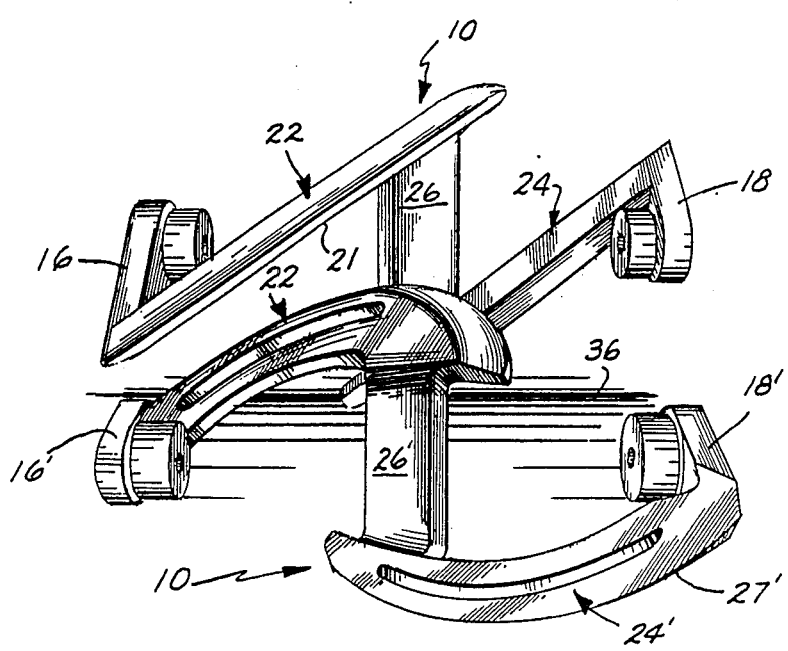
Figure 9:
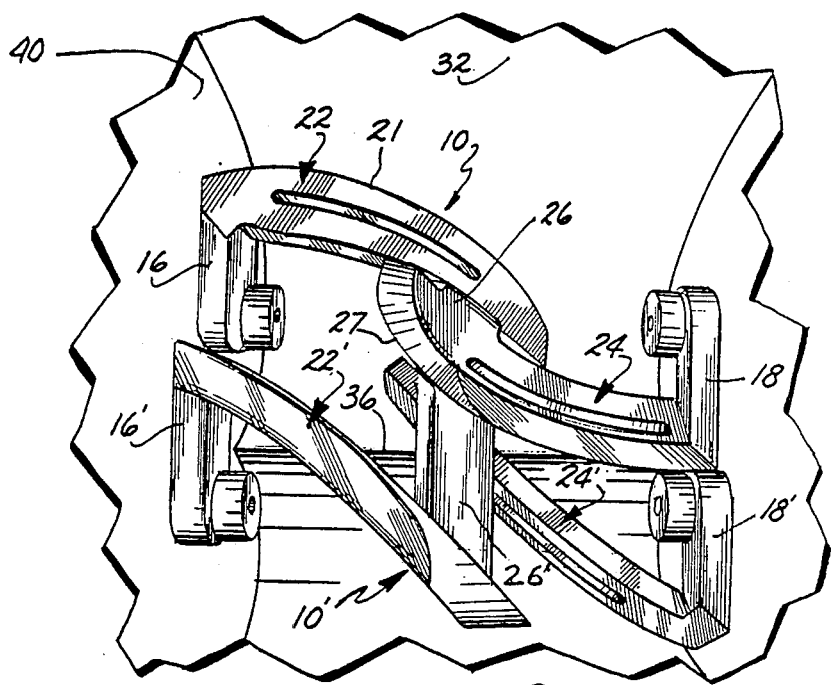
Figure 10:
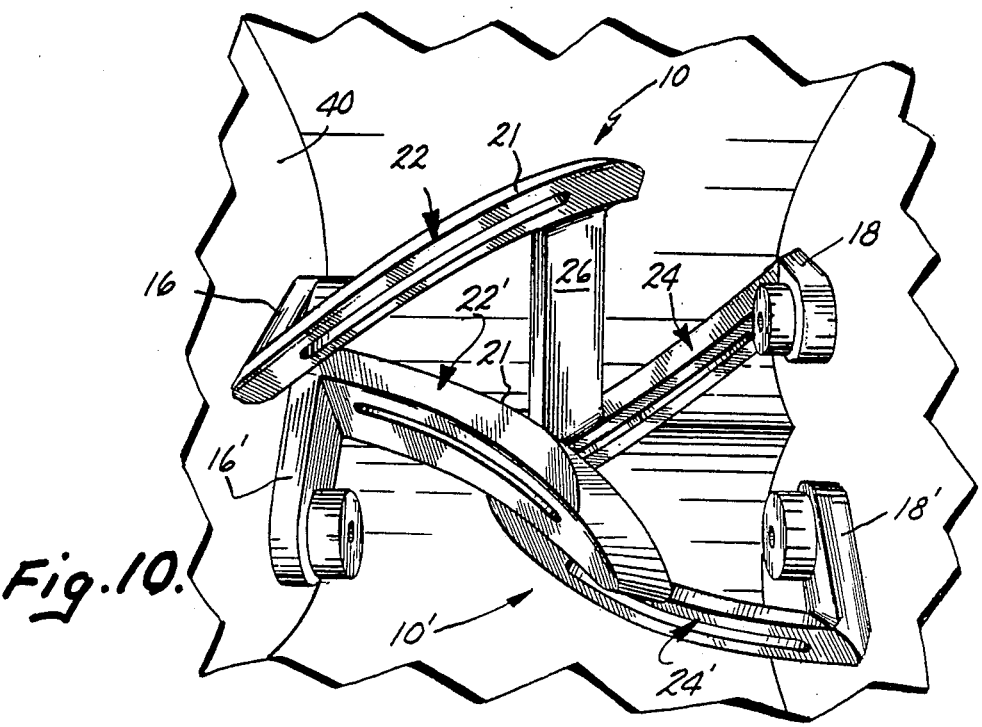

As the two adjacent agitators 10, 10' rotate during normal operation of the mixer, they progress from the positional relationship shown in FIG. 8 through that of the succeeding FIGS. 9-11 inclusive, and from the position of FIG. 11 to that of FIG. 7. During this movement, the leading edges 21, 21' of mixing blades 24, 24' initially move downward toward the upraised central edge 36 extending along the bottom of the mixer housing, and away from one another, while the leading edges 27, 27' of mixing blades 24, 24' initially move upwardly within the housing and rotate toward one another. During this relative rotation, the inward end portions of mixer blades 22, 22' sweep across and approach reasonably closely to the oppositely-disposed center blades 26, 26' of the adjacent agitator, and as the agitators continue rotational movement from the positions generally shown in FIG. 7 back to those generally shown in FIG. 8, the inward end portions of mixing blades 24, 24' carry out an analogous sweeping movement with respect to the opposite side of the respective center blade 26, 26' of the adjacent agitator.

During the agitator motion just described, the inboard extension end portions 23 and 25 (and 23', 25') of each mixing blade sweep through that portion of the interior of the mixer housing, or bowl, which is located generally opposite the main (outboard) part of the other mixing blade of both agitators, in a counter-mixing motion. Also, the canted center blades 26, 26' are at the same time sweeping through and stirring the center area of the mixer, and the end result is a strong and vigorous composite mixing action in the center part of the housing. Additionally, it should be understood that during rotational movement of the two agitator structures 10, 10', the crank arms 16 and 18, and 16', 18', also perform a sweeping and mixing function in the area closely adjacent each of the end walls 38 and 40, and it should be further understood that in accordance with further aspects of the invention the leading edges and side surfaces of the crank arms may be angled and configured in a manner somewhat analogous to the center blades 26, 26', in order to bring about a specific mixing and media movement where that is desired.

It is to be understood that the above detailed description is merely that of certain exemplary preferred embodiments of the invention, and that numerous changes, alterations and variations may be made without departing from the underlying concepts and broader aspects of the invention. In particular, it should be understood that the component parts from which agitators in accordance with the invention are assembled are in the nature of standardized-type parts, and that any or all of these parts may be varied in size and shape from one specific agitator to another, to make the particular resulting agitator useful in a particular mixer arrangement or environment, even including those of the type known as "Steffan" mixers, and those known as "vertical mixers," which customarily utilize a somewhat spherically dished, bowl-like, mixer housing. Of course, as already stated hereinabove, the agitators themselves may be used either singly or in paired groupings, such as is illustrated, and the concept underlying the agitator will produce superior and desirable results in either such instance. Accordingly, the scope of the invention is to be understood as the same as set forth in the appended claims, which should be interpreted in accordance with the established principles of patent law, including the doctrine of equivalents.

The embodiments of the invention in which an exclusive property or privilege is claimed are defined as follows:

1. An agitator structure for mixers and the like, comprising: a pair of mutually-spaced hubs aligned with one another along an axis of rotation; a pair of mutually-spaced mixer blades, each such blade located on a different side of said axis from the other and extending generally longitudinally thereof but disposed at least partially along a different portion of such axis; each of said mixer blades disposed at a longitudinal angle with respect to said axis; support means coupling said mixer blades to said hubs for rotation therewith about said axis; each of said mixer blades comprising a generally planar member having a curved outer edge which lies substantially within the plane of its associated mixer blade; said curved outer edge of each of said mixer blades defining a cylindrical surface of revolution upon rotation of said blades around said axis, and the said cylindrical surface defined by each of said mixer blades adjoining that defined by the other to thereby form a generally continuous elongated cylindrical agitator envelope.

2. The agitator structure according to claim 1, wherein each of the mixer blades in said pair thereof is an outboard end portion located at a point disposed radially outwardly from an opposite one of said hubs, and each of said blades extends from such outboard end to an inboard end which is located between said hubs but disposed at a radial distance from said rotational axis.

3. The agitator structure according to claim 2, wherein said agitator structure is shaftless in nature and has open space between said hubs along said axis of rotation.

4. The agitator structure according to claim 2, wherein each of said mixer blades has an effective length along said axis which is greater than half the overall distance between said hubs along said axis.

5. The agitator structure according to claim 4, wherein at least portions of the inboard end extremities of said mixer blades have a generally cylindrical outer surface periphery.

6. The agitator structure according to claim 2, and including connector means secured to each of said mixer blades at a point generally adjacent said inboard end of each and extending generally toward and into contact with structure which is rigidly connected to the other such blade, to thereby rigidly support said inboard ends of said blades.

7. The agitator structure according to claim 6, wherein said connector means extends generally across said axis and directly interconnects said mixer blades.

8. The agitator structure according to claim 7, wherein said connector means comprises a plate-like member which is disposed to intersect each of said mixer blades at an angle with respect to the planes in which each of said blades are disposed.

9. The agitator structure according to claim 8, wherein said mixer blades lie in different planes and such planes are generally parallel to one another.

10. The agitator structure according to claim 7, wherein said connector means comprises a plate-like member and such member is disposed in a plane which angularly intersects said rotational axis.

11. The agitator structure according to claim 10, wherein said plane of said plate-like member intersects said rotational axis at a pair of angles.

12. The agitator structure according to claim 11, wherein said agitator structure is shaftless in nature and has an open space between said hubs along said axis of rotation.

13. The agitator structure according to claim 7, wherein said connector means intersects said mixer blades at a location which is generally adjacent to but spaced at least somewhat from the said inboard ends of said blades, such that said inboard ends project beyond said location.

14. The agitator structure according to claim 13, wherein at least portions of the inboard end extremities of said mixer blades have a generally cylindrical outer surface periphery.

15. The agitator structure according to claim 6, wherein said connector means comprises a pair of strut-like members, each such member being secured to a different one of said mixer blades and rigidly connected between that blade and the hub which is located closest to the other such mixer blade.

16. The agitator structure according to claim 15, wherein said agitator structure is shaftless in nature and has an open space between said hubs along said axis of rotation.

17. The agitator structure according to claim 15, wherein said strut-like members each extend directly between one of said mixer blades and the hub to which the other such mixer blade is secured.

18. The agitator structure according to claim 17, wherein said strut-like members comprise generally flat-sided bar-like elements which are oriented to position at least one such generally flat side as a leading surface of said agitator during rotation thereof about said axis.

19. The agitator structure according to claim 18, wherein said bar-like elements have a generally rectangular cross section.

20. The agitator structure according to claim 19, wherein said bar-like elements are oriented such that an angular intersection of two adjacent sides constitutes a leading edge of said agitator during rotation thereof about said axis.

21. The agitator structure according to claim 20, wherein said agitator structure is shaftless in nature and has open space between said hubs along said axis of rotation.

22. The agitator structure according to claim 15, wherein said strut-like members are secured to the inboard end portion of the respective mixer blade from which they extend.

23. The agitator structure according to claim 15, wherein each of said mixer blades is at least slightly longer than the strut-like member to which it is secured.

24. The agitator structure according to claim 15, wherein said mixer blades lie in different planes and such planes are disposed generally parallel to one another.

25. The agitator structure according to claim 15, wherein said strut-like members lie in different planes and such planes are disposed generally parallel to one another.

26. The agitator structure according to claim 25, wherein said mixer blades lie in different planes and such planes are disposed generally parallel to one another.

27. An agitator structure for mixers and the like, comprising: a pair of mutually-spaced hubs aligned with one another along an axis of rotation; at least one mixer blade, said blade extending generally longitudinally alongside said axis but disposed at a longitudinal angle with respect to said axis; support means rigidly connecting said mixer blade to said hubs for rotation therewith about said axis; said mixer blade comprising a generally planar member having a curved outer edge which lies substantially within the plane of its associated mixer blade; said curved outer edge of each of said mixer blades defining a cylindrical surface of revolution upon rotation of said blades around their said axis.

28. The agitator structure according to claim 27, wherein said generally planar mixer blade comprises a generally flat member formed from plate stock.

29. The agitator structure according to claim 28, wherein said mixer blade has a cross-sectional shape which is generally trapezoidal.

30. The agitator structure according to claim 29, wherein said blade member has generally flat sides and said curved outer edge comprises an end surface which is angularly disposed with respect to said generally flat sides and forms one of the angular sides of said trapezoidal cross section.

31. The agitator structure according to claim 30, wherein one of said generally flat sides of said blade member comprises a leading surface of said mixer blade when the latter is rotated.

32. The agitator structure according to claim 31, wherein the apex of said generally flat side comprising said leading surface and said curved outer edge which is angularly disposed to said sides forms a leading edge which is disposed at the radially-outward extremity of said blade member.

33. The agitator structure according to claim 27, wherein said curved outer edge of said mixer blade defines an angular leading edge.

34. An agitator structure for mixers and the like, comprising: a pair of mutually-spaced hubs aligned with one another along an axis of rotation; a pair of mutually-spaced mixer blades, each such blade located on a different side of said axis from the other and extending generally longitudinally thereof but disposed at least partially along a different portion of such axis; each of said mixer blades disposed at a longitudinal angle with respect to said axis; a pair of crank arms, each disposed at the outboard end of a different one of said mixer blades and rigidly connected between such blade end and a different one of said hubs; and a rigid cross-member secured in place between said mixer blades inboard of and between said outboard ends thereof, to support and reinforce the inboard end portions of said mixer blades; each of said mixer blades, said crank arms, and said cross-member being from plate-like stock and having a pair of generally flat and parallel opposite sides; and means for rigidly securing said mixer blades, said crank arms and said cross-member together into a unified structure such that driving rotation of said hubs imparts rotation to said crank arms and the latter in turn cause resultant revolution of said blades around said axis.

35. The agitator structure according to claim 34 wherein each of said crank arms in said pair thereof is disposed generally orthogonally with respect to said axis and said mixer blades extend at an acute angle with respect to the plane of their associated crank arm; said mixer blades each also extending at an acute longitudinal angle with respect to said rotational axis.

36. The agitator structure according to claim 35 wherein said cross-member extends across said rotational axis at an acute angle with respect thereto.

* * * * *